United States Patent
Li et al.

(10) Patent No.: US 10,817,095 B2
(45) Date of Patent: Oct. 27, 2020

(54) ELECTRONIC DEVICE, TOUCH DISPLAY PANEL AND TOUCH DISPLAY SUBSTRATE

(71) Applicants: Shanghai Tianma Micro-Electronics Co., Ltd., Shanghai (CN); Tianma Micro-Electronics Co., Ltd., Shenzhen (CN)

(72) Inventors: Gujun Li, Shanghai (CN); Yungang Sun, Shanghai (CN); Lingxiao Du, Shanghai (CN); Conghua Ma, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 16/660,752

(22) Filed: Oct. 22, 2019

(65) Prior Publication Data
US 2020/0050312 A1    Feb. 13, 2020

Related U.S. Application Data

(62) Division of application No. 15/000,829, filed on Jan. 19, 2016, now Pat. No. 10,488,960.

(30) Foreign Application Priority Data

Apr. 1, 2015    (CN) .......................... 2015 1 0153208

(51) Int. Cl.
*G06F 3/041*    (2006.01)
*G02F 1/1333*    (2006.01)
(Continued)

(52) U.S. Cl.
CPC ........ *G06F 3/0412* (2013.01); *G02F 1/13338* (2013.01); *G06F 3/044* (2013.01);
(Continued)

(58) Field of Classification Search
CPC .................. G06F 3/0412; G06F 3/044; G06F 2203/04107; G02F 1/13338; G02F 1/136286
See application file for complete search history.

(56) References Cited

U.S. PATENT DOCUMENTS

2013/0155000 A1* 6/2013 Trend ................. H03K 17/9622
345/174
2014/0118277 A1* 5/2014 Kim ....................... G06F 3/044
345/173

* cited by examiner

*Primary Examiner* — Wing H Chow
(74) *Attorney, Agent, or Firm* — Alston & Bird LLP (57) ABSTRACT

An electronic device, a touch display panel and a touch display substrate are provided. The touch display substrate includes: a substrate; a common electrode layer disposed on the substrate, where the common electrode layer includes multiple touch display electrodes insulated from each other, and the touch display electrodes are arranged in an array; and multiple touch display wires insulated from each other, where the touch display wires and the touch display electrodes are arranged and connected electrically according to a one-to-one correspondence. Areas of at least two touch display electrodes increase gradually in a first direction, and the first direction is an extending direction of the touch display wire and extends from a contact point between the touch display wire and the touch display electrode to an edge of the substrate.

19 Claims, 5 Drawing Sheets

(51) Int. Cl.
  *G06F 3/044* (2006.01)
  *G02F 1/1362* (2006.01)
(52) U.S. Cl.
  CPC .................. *G02F 1/136286* (2013.01); *G06F 2203/04107* (2013.01)

ELECTRONIC DEVICE, TOUCH DISPLAY PANEL AND TOUCH DISPLAY SUBSTRATE

CROSS REFERENCE OF RELATED APPLICATION

The present application is a divisional application of U.S. patent application Ser. No. 15/000,829, filed on Jan. 19, 2016, which claims priority to Chinese Patent Application No. 201510153208.1, entitled "ELECTRONIC DEVICE, TOUCH DISPLAY PANEL AND TOUCH DISPLAY SUBSTRATE", filed on Apr. 1, 2015, the entire disclosures of the above applications are incorporated herein by reference.

FIELD

The disclosure relates to the technical field of touch display, and in particular, to an electronic device, a touch display panel and a touch display substrate.

BACKGROUND

At early phases of development of touch display technologies, a touch display panel is formed by attaching a touch panel to a display panel, to achieve a touch display function. The touch panel and the display panel need to be manufactured separately; hence, the cost is high, the thickness is large, and the production efficiency is low.

With the development of touch-display integration technology, a common electrode in the array substrate of the display panel can be double as touch sensing electrodes for touch detection, a touch control and a display control are performed in a time-division manner by a time-division driving, to achieve a touch function and a display function. Therefore, the touch sensing electrodes are integrated in the display panel, and accordingly, the cost is decreased, the production efficiency is improved, and the thickness of the panel is reduced.

In a case that the common electrode further serves as touch sensing electrodes, a common electrode layer may be divided into multiple touch display electrodes. To achieve the touch control and the display control in a time-division manner, a voltage signal is provided to each of the touch display electrodes through an individual wire, touch sensing signal are provided to corresponding touch display electrodes through the wires in a touch stage, and display driving voltages are provided to corresponding touch display electrodes through the wires in a display stage.

Although the conventional touch display panel has the touch function and the display function, the accuracy of touch detection is poor.

SUMMARY

In view of the above, it is provided an electronic device, a touch display panel and a touch display substrate according to the present disclosure, to improve the accuracy of touch detection.

It is provided the following technical solutions in the present disclosure. It is provided a touch display substrate, which includes: a substrate; a common electrode layer and multiple touch display wires disposed above the substrate, where the multiple touch display wires are insulated from each other; where the common electrode layer includes multiple touch display electrodes insulated from each other, and the touch display electrodes are arranged in an array; and the touch display wires and the touch display electrodes are arranged and connected electrically according to a one-to-one correspondence between the touch display wires and the touch display electrodes, areas of at least two touch display electrodes increase gradually along a first direction, and the first direction is an extending direction of the touch display wire and extends from a contact point between the touch display wire and the touch display electrode to an edge of the substrate. It is further provided a touch display substrate, which includes: a substrate; a common electrode layer disposed on the substrate, where the common electrode layer includes multiple touch display electrodes insulated from each other, and the touch display electrodes are arranged in an array; and multiple touch display wires insulated from each other, where the touch display wires and the touch display electrodes are arranged and connected electrically according to a one-to-one correspondence between the touch display wires and the touch display electrodes, and a total capacitance of one touch display electrode and a touch display wire corresponding to the one touch display electrode is equal to a total capacitance of another touch display electrode and a touch display wire corresponding to the another touch display electrode.

It is further provided a touch display panel according to the present disclosure, which includes: a first substrate and a second substrate disposed opposite to the first substrate; and a liquid crystal layer disposed between the first substrate and the second substrate; where the first substrate is the touch display substrate described above.

It is further provided an electronic device, which includes a driving circuit and the touch display panel described above.

From the above description, in the touch display substrate, the touch display panel, and the electronic device according to the disclosure, the areas of the touch display electrodes increase in the first direction, such that a total capacitances of one touch display electrode and corresponding touch display wire(s) is approximately equal to that of another display electrode and corresponding touch display wire(s), thereby decreasing difference between the touch capacitances of two touch display units adjacent in the first direction and improving the accuracy of touch detection.

BRIEF DESCRIPTION OF THE DRAWINGS

To illustrate technical solutions according to embodiments of the present disclosure or in the conventional technologies more clearly, drawings to be used in the descriptions of the conventional technologies or the embodiments are described briefly hereinafter. Apparently, the drawings described hereinafter are only for some embodiments of the present disclosure, and other drawings may be obtained by those skilled in the art based on those drawings without creative efforts.

DETAILED DESCRIPTION OF EMBODIMENTS

Technical solutions in embodiments of the present disclosure are described clearly and completely hereinafter in conjunction with the drawings in the embodiments of the present disclosure. Apparently, the described embodiments are only a part rather than all of the embodiments of the present application. All the other embodiments obtained by those skilled in the art without creative effort on the basis of the embodiments of the present disclosure fall within the scope of protection of the present disclosure.

Figure 1:
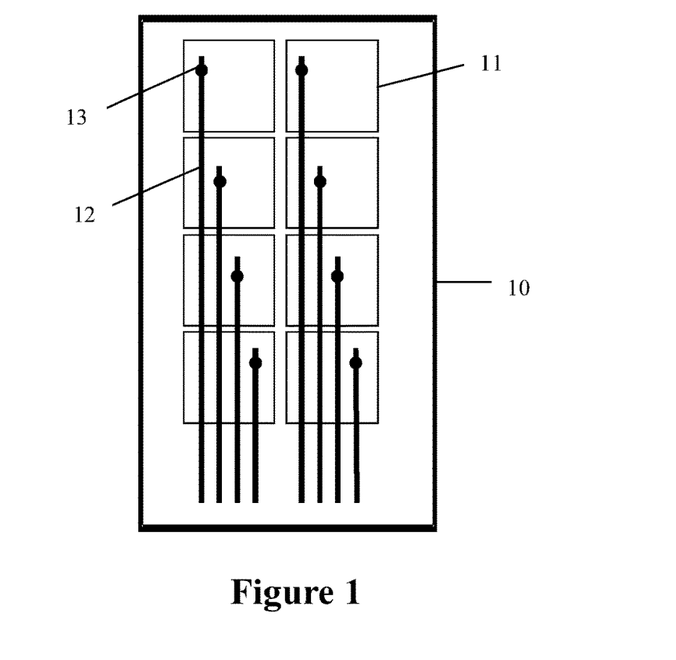
FIG. 1 is a schematic structural diagram of a conventional touch display substrate.

Reference is made to FIG. 1, which is a schematic structural diagram of a conventional touch display substrate. The touch display substrate includes: a substrate 10, and a common electrode layer and a touch display wire layer each disposed above the substrate 10. The common electrode layer is disposed opposite to the touch display wire layer, and an insulating layer is disposed between the common electrode layer and the touch display wire layer. The common electrode layer includes multiple touch display electrodes 11 arranged in an array. The touch display wire layer includes multiple touch display wires 12. The touch display wires 12 extend, along a same direction, to a same edge of the substrate, which is convenient to bind a chip. The touch display wires 12 are electrically connected to the touch display electrodes 11 through via holes 13, and there is a one-to-one correspondence between the touch display wires 12 and the touch display electrodes 11.

In a case that one touch display electrode 11 and the touch display wire 12 connected to the touch display electrode 11 are defined as one touch display unit, a coupling capacitor is formed between one touch display unit and the touch display wire of another touch display unit in the conventional touch display substrate. The coupling capacitances for the respective touch display units are different since the lengths of the touch display wires corresponding to the touch display units are different in the vertical direction shown in FIG. 1.

In one column of touch display electrodes having the same size, along a extending direction of the touch display wire 12 (from upper portion to lower portion shown in FIG. 1), the number of the touch display wire(s) 12 of other touch display units overlapping one touch display unit gradually increases, and accordingly, along the extending direction of the touch display wire 12, coupling capacitances of the touch display units gradually increase. Taking a self-capacitive touch detection as an example, a touch detection capacitance includes a capacitance (reference capacitance) between a touch display unit being touched and a finger, and the coupling capacitance of the touch display unit. For one touch display unit, it can be equivalently understood that a touch display electrode is shared as a common substrate by a reference capacitor and a coupling capacitor, that is, the reference capacitor and the corresponding coupling capacitor are connected in series, and the total capacitance (touch detection capacitance) of the reference capacitor and the coupling capacitor decreases as the coupling capacitance increases. Consequently, touch detection capacitances gradually decrease in the extending direction of the touch display wire.

In this case, touch detection capacitances of the touch display units in the vertical direction vary and gradually decrease in the extending direction, thereby resulting in a low accuracy of the touch detection.

In view of the above problems, it is provided a touch display substrate in present application. The touch display substrate includes: a substrate; and a common electrode layer and multiple touch display wires disposed above the substrate, where the multiple touch display wires are insulated from each other. The touch display wires are manufactured through one metal layer. The common electrode layer is disposed in the same layer with the metal layer.

The common electrode layer includes multiple touch display electrodes insulated from each other, and the touch display electrodes are arranged in an array. The touch display wires and the touch display electrodes are provided and connected electrically according to a one-to-one correspondence.

Areas of at least two touch display electrodes are gradually increased in a first direction, and the first direction is an extending direction of the touch display wire and extends from a contact point between the touch display wire and the touch display electrode to an edge of the substrate.

In the touch display substrate according to the present application, for one column of touch display electrodes, the areas of the touch display electrodes increase gradually in the first direction, and accordingly, the reference capacitances increase gradually, and differences between the touch detection capacitances of the touch display units are reduced or the touch detection capacitances of the touch display units are equal. For one touch display unit, a touch detection capacitance C is indicated as follows:

$$= \frac{_2}{1 - \frac{_2}{_1}}.$$

Where, $_1$ represents a reference capacitance, and $_2$ represents a coupling capacitance. The coupling capacitance mainly depends on the number of the touch display wires being coupled. For any one touch display unit, in the case that the number of the touch display wires coupled to the touch display unit remains unchanged, a change of the coupling capacitance due to a change of the area of the touch display electrode is not taken into consideration, and $_2$ is a constant accordingly; and the touch detection capacitance increases as the area of the touch display electrode increases. Therefore, the touch detection capacitances increase gradually since the areas of the touch display electrodes increase gradually in the first direction, and the changing trend of the touch detection capacitances is opposite to the decreasing of the touch detection capacitances due to the different coupling capacitances in the first direction; hence, differences between the touch detection capacitances of the touch display units along the first direction are reduced or the touch detection capacitances of the touch display units are equal, thereby improving the accuracy of the touch detection.

Figure 2:
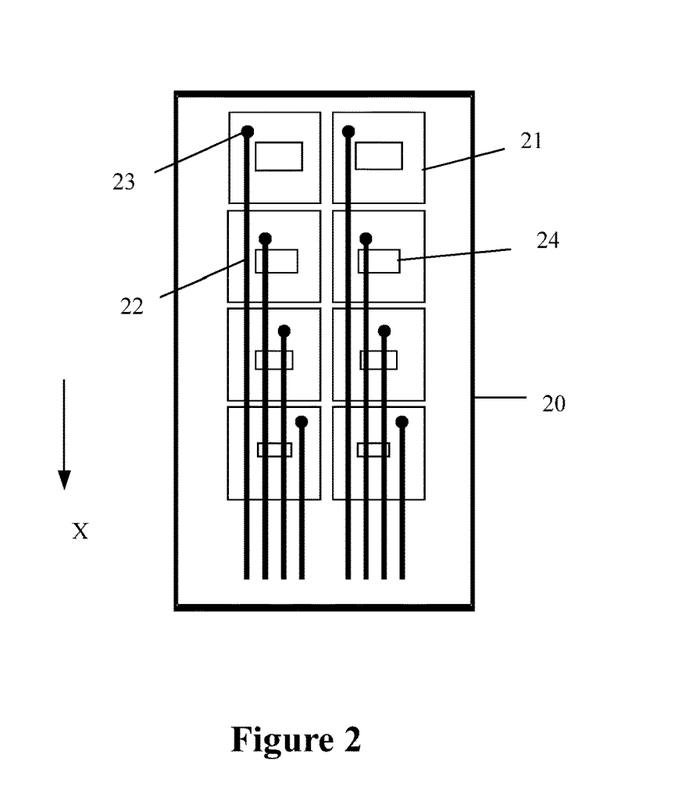
FIG. 2 is a schematic structural diagram of a touch display substrate according to an embodiment of the present application.

A touch display substrate according to an embodiment of the application is shown in FIG. 2, which is a schematic structural diagram of a touch display substrate according to an embodiment of the present application. In the touch display substrate shown in FIG. 2, a common electrode layer and multiple touch display wires 22 are disposed above a substrate 20. The common electrode layer includes multiple touch display electrodes 21, which are respectively connected to the touch display wires 22 through via holes 23. The extending direction of the touch display wire 22 is a first direction X.

In the embodiment shown in FIG. 2, the touch display electrodes 21 are rectangle electrodes of the same length and the same width, and an opening 24 is disposed in each of the rectangle electrodes. The areas of the openings 24 gradually decrease along the first direction X, such that the areas of the touch display electrodes 21 increase gradually. The opening 24 has a regular planar geometrical shape or an irregular planar geometrical shape, for example, the opening 24 may be in a shape of a triangle, a rectangle, a circle, an ellipse or an irregular planar polygon.

Figure 3:
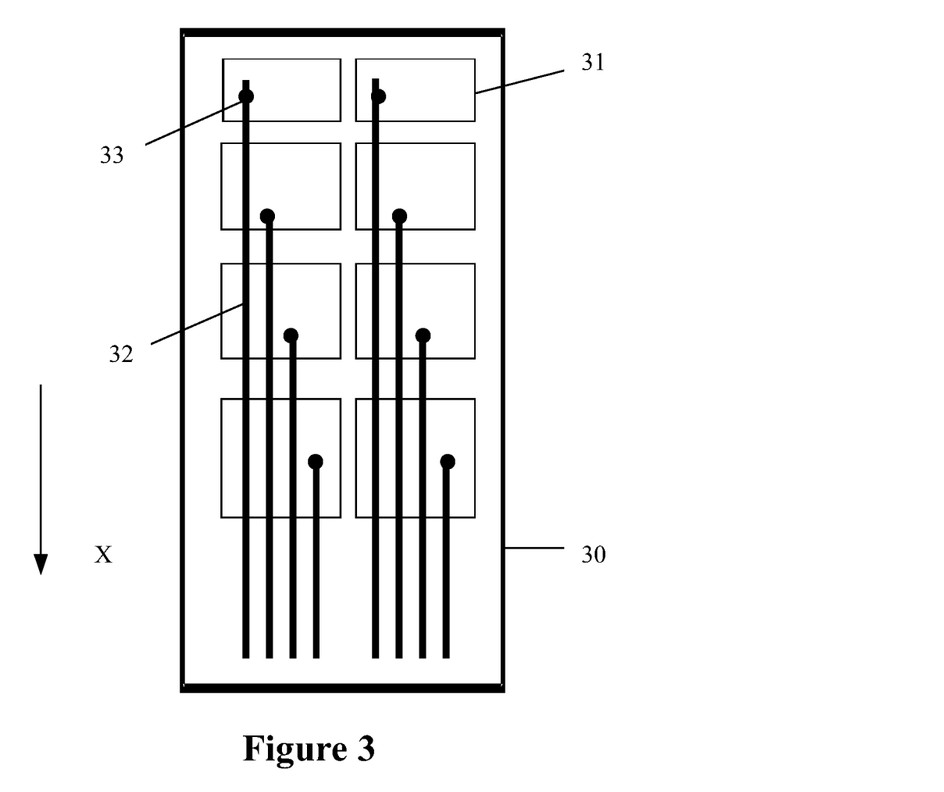
FIG. 3 is a schematic structural diagram of a touch display substrate according to an embodiment of the present application.

A touch display substrate according to an embodiment of the application is shown in FIG. 3, which is a schematic structural diagram of a touch display substrate according to an embodiment of the present application. In an array substrate shown in FIG. 3, a common electrode layer and multiple touch display wires 32 are disposed on a substrate 30. The common electrode layer includes multiple touch display electrodes 31, which are respectively connected to the touch display wires 32 through via holes 33. The touch display electrodes 31 are arranged as rectangle electrodes, and for one column of touch display electrodes, the lengths of vertical edges of the touch display electrodes 31 increase gradually, and the widths of horizontal edges of the touch display electrodes are identical, where the vertical edges are in the first direction X and the horizontal edges are perpendicular to the first direction; with such arrangement, the areas of the touch display electrodes 31 increase gradually in the first direction X.

According to the embodiments shown in FIG. 2 and FIG. 3, the areas of the touch display electrodes increase in the first direction X, and accordingly, difference between the touch detection capacitances of two touch display units is decreased, thereby improving the accuracy of the touch detection. Compared with the embodiment shown in FIG. 2, it is not necessary to etch openings in the touch display electrodes 31 in the embodiment shown in FIG. 3, thereby simplifying manufacture process and reducing costs.

The touch display substrate according to the embodiments of the present application may be an array substrate. In this case, the touch display substrate further includes: a thin film transistor; a gate line connected to a gate of the thin film transistor; a data line connected to a source of the thin film transistor, and a pixel electrode connected to a drain of the thin film transistor.

Figure 4:
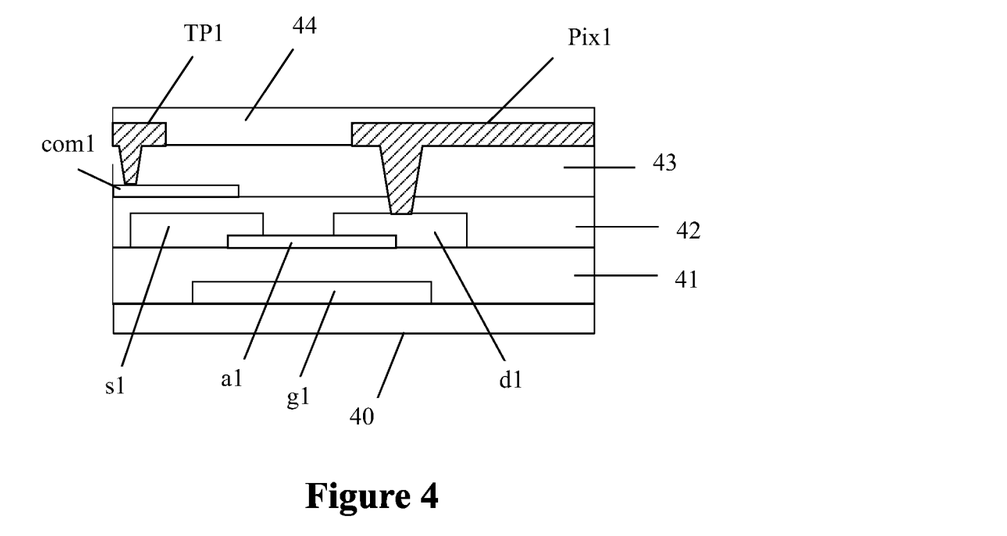
FIG. 4 is a schematic structural diagram of a touch display substrate according to an embodiment of the present application.

In a case that the touch display substrate is an array substrate, a structure of the touch display substrate may be shown in FIG. 4, which is a schematic structural diagram of a touch display substrate according to an embodiment of the present application. A thin film transistor is disposed in the array substrate and is disposed on a surface of a substrate 40. The thin film transistor includes: a gate g1 and a gate line (not shown in FIG. 4) disposed on a surface of the substrate 40; a gate dielectric layer 41 covering the gate g1 and the gate line; and an active region a1, a source s1 and a drain d1 disposed on a surface of the gate dielectric layer 41. A data line (not shown in FIG. 4) connected to the source s1 is disposed on a surface of the gate dielectric layer 41, and the data line is disposed in the same layer with the source s1.

In the touch display substrate shown in FIG. 4, the thin film transistor is disposed on a surface of the substrate 40; a first insulating layer 42 is provided covering the thin film transistor; a common electrode layer com1 is disposed on a surface of the first insulating layer 42, and a second insulating layer 43 is disposed on a surface of the common electrode layer com1; and a touch display wire TP1 and a pixel electrode Pix1 are disposed on a surface of the second insulating layer 43, and the pixel electrode Pix1 is electrically connected to the drain d1 of the thin film transistor through a via hole. The touch display wire TP1 is electrically connected, through a via hole, to a touch display electrode corresponding to the common electrode layer com1.

In the embodiment shown in FIG. 4, the touch display wire TP1 and the pixel electrode Pix1 are disposed in the same layer and can be manufactured simultaneously through one conductive layer, thereby simplifying manufacturing process and reducing manufacturing costs. A third insulating layer 44 is disposed on the touch display wire TP1 and the pixel electrode Pix1. A wire shielding electrode (not shown in FIG. 4) may be disposed on the third insulating layer 44 and be partially overlapped with the touch display wire TP1, to protect the touch display wire TP1 from electromagnetic interference.

Figure 5:
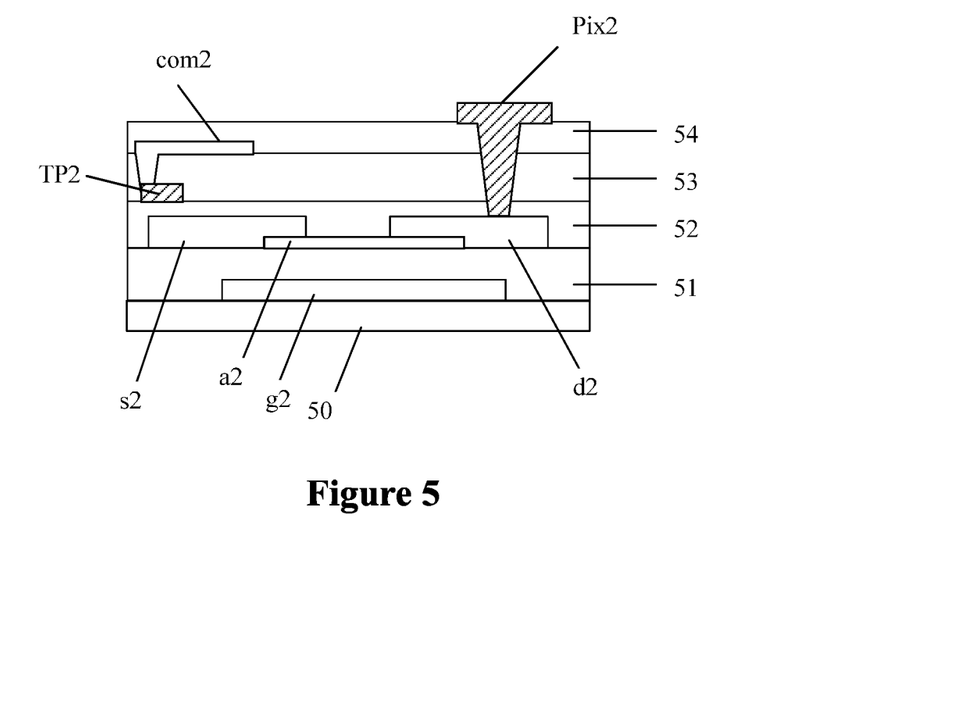
FIG. 5 is a schematic structural diagram of a touch display substrate according to an embodiment of the present application.

In a case that the touch display substrate is an array substrate, a structure of the touch display substrate may be shown in FIG. 5, which is a schematic structural diagram of a touch display substrate according to another embodiment of the present application. A thin film transistor is disposed in the array substrate and is disposed on a surface of a substrate 50. The thin film transistor includes: a gate g2 and a gate line (not shown in FIG. 5) disposed on a surface of the substrate 50; a gate dielectric layer 51 covering the gate g2 and the gate line; and an active region a2, a source s2 and a drain d2 disposed on a surface of the gate dielectric layer 51. A data line (not shown in FIG. 5) connected to the source s2 is disposed on a surface of the gate dielectric layer 51, and the data line is disposed in the same layer with the source s2.

In the touch display substrate shown in FIG. 5, the thin film transistor is disposed on a surface of the substrate 50; a first insulating layer 52 is provided covering the thin film transistor; a touch display wire TP2 is disposed on a surface of the first insulating layer 52, and a second insulating layer 53 is provided covering the touch display wire TP2; a common electrode layer com2 is disposed on a surface of the second insulating layer 53 and a third insulating layer 54 is disposed on a surface of the common electrode layer com2; a pixel electrode Pix2 is disposed on a surface of the third insulating layer 54 and is electrically connected to the drain d2 of the thin film transistor through a via hole. The touch display wire TP2 is electrically connected, through a via hole, to a touch display electrode corresponding to the common electrode layer com2.

A wire shielding electrode (not shown in FIG. 5) may be disposed over the touch display wire TP2 and is partially overlapped with the touch display wire TP2, to protect the touch display wire TP2 from electromagnetic interference. Specifically, the second insulating layer 53 may have a structure including two insulating layers, and the wire shielding electrode is disposed between the two insulating layers and is located over the touch display wire TP2.

Figure 6:
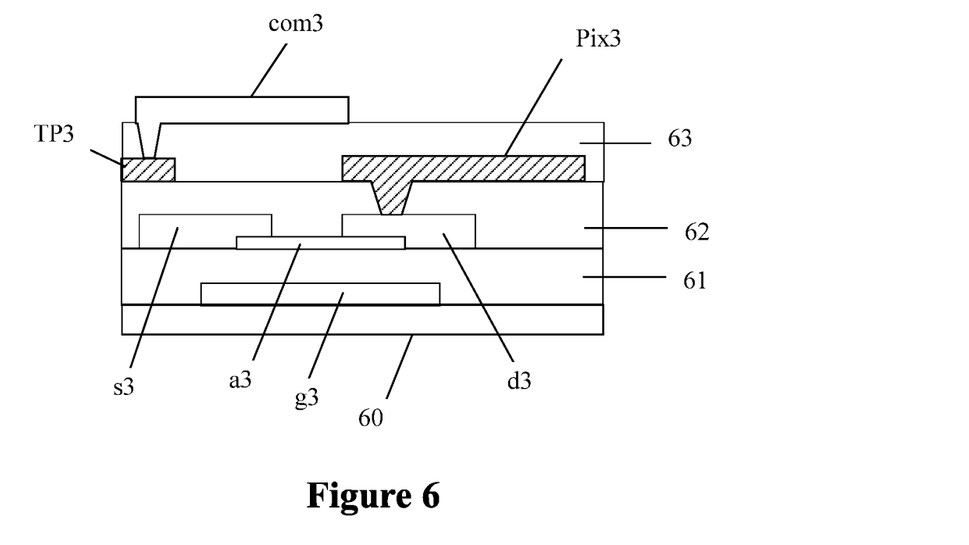
FIG. 6 is a schematic structural diagram of a touch display substrate according to an embodiment of the present application.

In a case that the touch display substrate is an array substrate, a structure of the touch display substrate may be shown in FIG. 6, which is a schematic structural diagram of a touch display substrate according to an embodiment of the present application. A thin film transistor is disposed in the array substrate and disposed on a surface of a substrate 60. The thin film transistor includes: a gate g3 and a gate line (not shown in FIG. 6) disposed on a surface of the substrate 60; a gate dielectric layer 61 covering the gate g3 and the gate line; and an active region a3, a source s3 and a drain d3 disposed on a surface of the gate dielectric layer 61. A data line (not shown in FIG. 6) connected to the source s3 is disposed on a surface of the gate dielectric layer 61, and the data line is disposed in the same layer with the source s3.

In the touch display substrate shown in FIG. 6, the thin film transistor is disposed on a surface of the substrate 60; a first insulating layer 62 is provided covering the thin film transistor; a touch display wire TP3 and a pixel electrode Pix3 are disposed on a surface of the first insulating layer 62, the pixel electrode Pix3 is electrically connected to the drain d3 of the thin film transistor through a via hole, and a second insulating layer 63 is disposed on surfaces of the touch display wire TP3 and the pixel electrode Pix3; and a common electrode layer com3 is disposed on a surface of the second insulating layer 63.

In the embodiment shown in FIG. 6, the touch display wire TP3 and the pixel electrode Pix3 are disposed in the same layer and can be manufactured simultaneously through one conductive layer, thereby simplifying manufacturing process and reducing manufacturing costs. A wire shielding electrode (not shown in FIG. 6) may be disposed over the touch display wire TP3 and be partially overlapped with the touch display wire TP3, to protect the touch display wire TP3 from electromagnetic interference. Specifically, the second insulating layer 63 may have a structure including two insulating layers, and the wire shielding electrode is disposed between the two insulating layers and is located over the touch display wire TP3.

In the touch display substrate according to the embodiments of the present application, the touch display wire is disposed to be overlapped with the data line or the gate line, that is, the touch display wire is disposed opposite to the data line or the gate line in the direction perpendicular to the substrate, such that the touch display substrate has a high opening ratio and a good light transmitting effect.

The touch display substrate according to the embodiments of the present application may be a color film substrate. In this case, the touch display substrate includes a color film layer.

Figure 7:
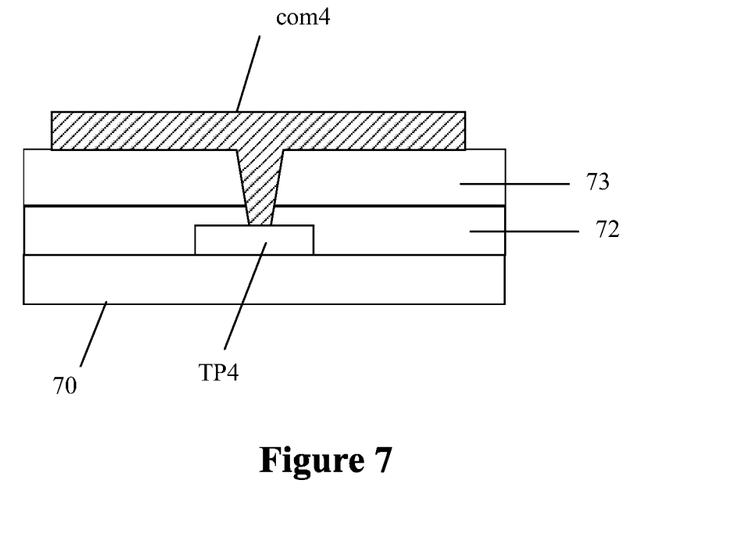
FIG. 7 is a schematic structural diagram of a touch display substrate according to an embodiment of the present application.

In a case that the touch display substrate is a color film substrate, a structure of the touch display substrate may be shown in FIG. 7, which is a schematic structural diagram of a touch display substrate according to an embodiment of the present application. In an array substrate shown in FIG. 7, a touch display wire TP4 is disposed on a surface of a substrate 70, an insulating layer 72 is provided covering the touch display wire TP4, a color film layer 73 is disposed on the insulating layer 72 and a common electrode layer com4 is disposed on the color film layer 73. The touch display wire TP4 is electrically connected, through the via hole, to a touch display electrode corresponding to the common electrode layer com4.

Figure 8:
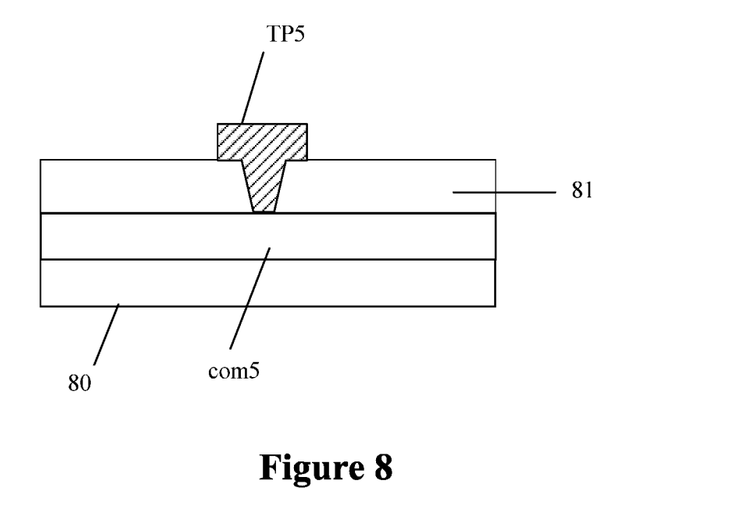
FIG. 8 is a schematic structural diagram of a touch display substrate according to an embodiment of the present application.

In a case that the touch display substrate is a color film substrate, a structure of the touch display substrate may be shown in FIG. 8, which is a schematic structural diagram of a touch display substrate according to an embodiment of the present application. In an array substrate shown in FIG. 8, a common electrode layer com5 is disposed on a surface of a substrate 80, a color film layer 81 is disposed on a surface of the common electrode layer com5, and a touch display wire TP5 is disposed on a surface of the color film layer 81. The touch display wire TP5 is electrically connected, through a via hole, to a touch display electrode corresponding to the common electrode layer com5.

In the color film substrate shown in FIG. 7 to FIG. 8, a wire shielding electrode may be disposed for the touch display wire and be partially overlapped with the corresponding touch display wire.

No matter whether the touch display substrate is an array substrate or a color film substrate, in the case that the touch display substrate includes a wire shielding electrode disposed over the touch display wire, the wire shielding electrode is partially overlapped with the corresponding touch display wire. In addition, the wire shielding electrode is grounded to achieve a better electromagnetic shielding.

In the touch display substrate according to the embodiments of the present application, areas of touch display electrodes of touch display units can be adjusted such that difference between touch detection capacitances of any two touch display units adjacent in the first direction is not greater than 1%, thereby ensuring the accuracy of touch detection. Preferably, the difference between the touch detection capacitances of any two touch display units adjacent in the first direction ranges from 0.2% to 0.5%. Difference between areas of any two touch display units adjacent in the first direction is not greater than 4%, and preferably, the difference between the areas of any two touch display units adjacent in the first direction ranges from 0.2% to 3%.

It is further provided a touch display substrate according to an embodiment of the present application, which includes: a substrate; a common electrode layer disposed on the substrate, where the common electrode layer includes multiple touch display electrodes insulated from each other and the touch display electrodes are arranged in an array; and multiple touch display wires insulated from each other, where the touch display wires and the touch display electrodes are arranged and electrically connected according to a one-to-one correspondence between the touch display wires and the touch display electrodes.

Specifically, a total capacitance of one touch display electrode and a touch display wire corresponding to the one touch display electrode is equal to a total capacitance of another display electrode and a touch display wire corresponding to the another touch display electrode.

The touch display substrate may be an array substrate. In this case, the touch display substrate further includes: a thin film transistor, a gate line connected to the gate of the thin film transistor, and a data line connected to the source of the thin film transistor.

The touch display substrate may be a color film substrate. In this case, the touch display substrate further includes a color film layer.

The touch detection capacitances of the respective touch display units are the same. It can be seen from the description above that the accuracy of the touch detection is affected by the differences between touch detection capacitances of the touch display units. In any one of the above embodiments, the touch detection capacitances of the respective touch display units are the same, thereby achieving the accuracy of touch display.

Figure 9:
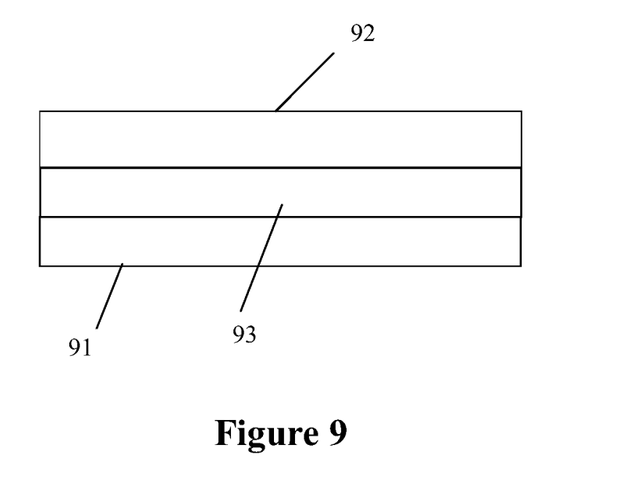
FIG. 9 is a schematic structural diagram of a touch display panel according to an embodiment of the present application.

It is further provided a touch display panel according to an embodiment of the present application, and reference is made to FIG. 9, which is a schematic structural diagram of a touch display panel according to an embodiment of the present application. The touch display panel includes: a first substrate 91 and a second substrate 92 disposed opposite to the first substrate 91; and a liquid crystal layer 93 between the first substrate 91 and the second substrate 92.

The first substrate 91 may be the touch display substrate according to any one of the above embodiments, and the first substrate 91 may be an array substrate or a color film substrate.

The touch display substrate described above is applied to the touch display panel according to the embodiment of the application, and thus the accuracy of the touch detection is improved.

Figure 10:
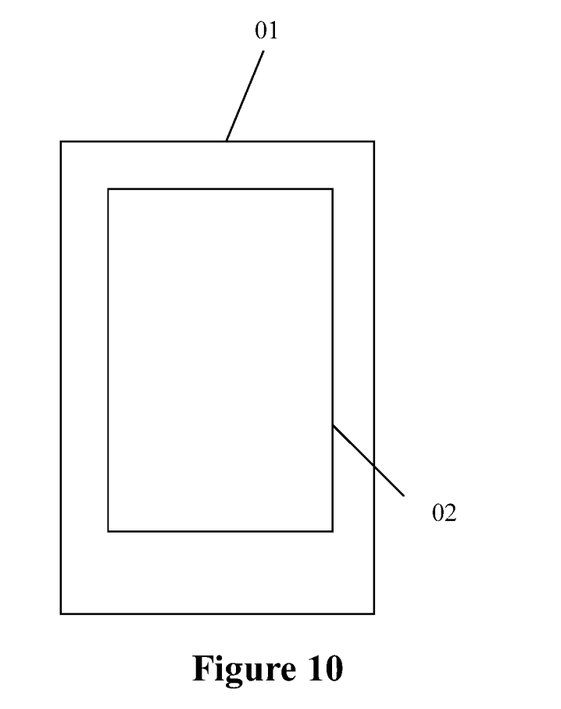
FIG. 10 is a schematic structural diagram of an electronic device according to an embodiment of the present application.

It is further provided an electronic device according to an embodiment of the present application, and reference is made to FIG. 10, which is a schematic structural diagram of a an electronic device according to an embodiment of the present application. The electronic device 01 includes a touch display panel 02 according to the above embodiment.

The touch display panel according to the above embodiment is applied to the electronic device according to the embodiment of the application, and thus the accuracy of the touch detection is improved. The electronic device may be a mobile phone, a computer or a TV.

Those skilled in the art are able to perform or apply the disclosure according to the above description of the disclosed embodiment. It is apparent for those skilled in the art to modify the embodiments in many ways. The general principle suggested by the application can be achieved in other embodiments without departing from the spirit or scope of the disclosure. Therefore, the disclosure should not be limited by these embodiments shown in the specification, but conform to the widest scope in accordance with the principle and the novelty disclosed in the disclosure.

The invention claimed is:

1. A touch display substrate, comprising:
   a substrate plate comprising a plurality of TFT transistors;
   a first insulating layer disposed on the plurality of TFT transistors;
   a common electrode layer on the first insulating layer, comprising a matrix of touch display electrodes insulated from each other and arranged in a first and a second directions perpendicular to each other, wherein an opening is disposed in each of the of the touch display electrodes, a total area covered by each of the touch display electrodes and a corresponding opening is identical in shape and dimension, and the openings in the matrix decreases areas sequentially along the first direction;
   a second insulating layer disposed on the first common electrode layer; and
   a touch display wire layer comprising a plurality of touch display wires disposed on the second insulating layer above the common electrode layer, along the first direction in parallel, separated from each other in the second direction;
   wherein a single electrode of the matrix of touch display electrodes electrically connects to one wire of the plurality of touch display wires in an one-to-one correspondence through via holes in the second insulating layer; and
   wherein each of the touch display electrodes in the first direction overlays more of the plurality of touch display wires due to the decreasing areas of the openings.

2. The touch display substrate according to claim 1, wherein the matrix comprises at least 3 rows and 3 columns.

3. The touch display substrate according to claim 1, wherein the total area covered by each of the touch display electrodes and the corresponding opening is rectangular.

4. The touch display substrate according to claim 1, wherein each of the openings has a regular planar geometrical shape.

5. The touch display substrate according to claim 4, wherein each of the openings is in a shape of a triangle, a rectangle, a circle, an ellipse or a polygon.

6. The touch display substrate according to claim 1, wherein each of the openings has an irregular planar geometrical shape.

7. The touch display substrate according to claim 1, wherein a difference between areas of openings of any two adjacent touch display electrodes in the first direction of the matrix is less than or equal to 4%.

8. The touch display substrate according to claim 1, wherein
   each of the touch display electrodes in the matrix and a corresponding one of the plurality of touch display wires connected to said touch display electrode form a touch display unit, and
   a difference between touch detection capacitances of any two adjacent touch display units in the first column direction of the array is less than or equal to 1%.

9. The touch display substrate according to claim 1, wherein pixel electrodes of the touch display substrate is located in the touch display wire layer.

10. The touch display substrate according to claim 1, further comprising a third insulating layer disposed on the touch display wire layer, wherein pixel electrodes of the touch display substrate is located on the third insulating layer.

11. The touch display substrate according to claim 1, further comprising a wire shielding electrode disposed above the plurality of touch display wires, wherein the wire shielding electrode is partially overlaying with the plurality of touch display wires.

12. The touch display substrate according to claim 1, wherein the second insulating layer includes a color film layer.

13. A touch display panel, comprising:
   a first substrate, and a second substrate disposed opposite to the first substrate; and
   a liquid crystal layer disposed between the first substrate and the second substrate, wherein the first substrate comprises:
   a substrate plate comprising a plurality of TFT transistors;
   a first insulating layer disposed on the plurality of TFT transistors;
   a common electrode layer on the first insulating layer, comprising a matrix of touch display electrodes insulated from each other and arranged in a first and a second directions perpendicular to each other, wherein an opening is disposed in each of the of the touch display electrodes, a total area covered by each of the touch display electrodes and a corresponding opening is identical in shape and dimension, and the openings in the matrix decreases areas sequentially along the first direction;
   a second insulating layer disposed on the first common electrode layer; and
   a touch display wire layer comprising a plurality of touch display wires disposed on the second insulating layer above the common electrode layer, along the first direction in parallel, separated from each other in the second direction;
   wherein a single electrode of the matrix of touch display electrodes electrically connects to one wire of the plurality of touch display wires in an one-to-one correspondence through via holes in the second insulating layer; and wherein each of the touch display electrodes in the first direction overlays more of the plurality of touch display wires due to the decreasing areas of the openings.

14. A touch display substrate, comprising:
a substrate plate comprising a plurality of TFT transistors;
a first insulating layer disposed on the plurality of TFT transistors;
a touch display wire layer comprising a plurality of touch display wires disposed on the first insulating layer, along the first direction in parallel, separated from each other in the second direction;
a second insulating layer disposed on the first insulating layer, covering the plurality of touch display wires; and
a common electrode layer formed on the second insulating layer, comprising a matrix of touch display electrodes insulated from each other and arranged in the first direction and a second direction perpendicular to the first direction, wherein an opening is disposed in each of the of the touch display electrodes, a total area covered by each of the touch display electrodes and a corresponding opening is identical in shape and dimension, and the openings in the matrix decreases areas sequentially along the first direction;
wherein a single electrode of the matrix of touch display electrodes electrically connects to one wire of the plurality of touch display wires in an one-to-one correspondence through via holes in the second insulating layer; and wherein each of the touch display electrodes in the first direction overlays more of the plurality of touch display wires due to the decreasing areas of the openings.

15. The touch display substrate according to claim 14, wherein a difference between areas of openings of any two adjacent touch display electrodes in the first direction of the matrix is less than or equal to 4%.

16. The touch display substrate according to claim 14, wherein pixel electrodes of the touch display substrate is located in the touch display wire layer.

17. The touch display substrate according to claim 14, further comprising a third insulating layer disposed on the common electrode layer, wherein pixel electrodes of the touch display substrate is located on the third insulating layer.

18. The touch display substrate according to claim 14, further comprising a color film layer disposed between the touch display wire layer and the second insulating layer.

19. The touch display substrate according to claim 14, further comprising a wire shielding electrode disposed above the plurality of touch display wires, wherein the wire shielding electrode is partially overlaying with the plurality of touch display wires.

* * * * *